(12) United States Patent
Beevers

(10) Patent No.: US 10,220,521 B2
(45) Date of Patent: Mar. 5, 2019

(54) TENDON AND RIGID ELEMENT ASSEMBLY

(71) Applicant: Timothy R. Beevers, McMinnville, OR (US)

(72) Inventor: Timothy R. Beevers, McMinnville, OR (US)

( * ) Notice: Subject to any disclaimer, the term of this patent is extended or adjusted under 35 U.S.C. 154(b) by 0 days.

(21) Appl. No.: 16/043,618

(22) Filed: Jul. 24, 2018

(65) Prior Publication Data

US 2018/0319021 A1  Nov. 8, 2018

Related U.S. Application Data

(63) Continuation of application No. 15/843,413, filed on Dec. 15, 2017, now Pat. No. 10,029,375, which is a continuation of application No. 14/734,390, filed on Jun. 9, 2015, now Pat. No. 9,844,886.

(51) Int. Cl.
| | |
|---|---|
| *B25J 15/00* | (2006.01) |
| *B25J 15/12* | (2006.01) |
| *B25J 19/00* | (2006.01) |
| *B25J 9/10* | (2006.01) |
| *B25J 15/10* | (2006.01) |

(52) U.S. Cl.
CPC ............ B25J 15/12 (2013.01); B25J 9/104 (2013.01); B25J 15/0009 (2013.01); B25J 15/10 (2013.01); B25J 19/0062 (2013.01); *Y10S 901/21* (2013.01); *Y10S 901/36* (2013.01)

(58) Field of Classification Search
CPC ........ B25J 15/12; B25J 9/104; B25J 15/0009; B25J 15/10; B25J 19/0062; B25J 15/0233; Y10S 901/21; Y10S 901/36; A61F 2/586; B23P 15/00

USPC .................................. 294/111, 200; 623/64

See application file for complete search history.

(56) References Cited

U.S. PATENT DOCUMENTS

| | | | |
|---|---|---|---|
| 2,545,452 A | 3/1951 | Fletcher | |
| 4,946,380 A | 8/1990 | Lee | |
| 5,647,723 A * | 7/1997 | Rush | B25J 9/1085 |
| | | | 294/111 |
| 6,817,641 B1 | 11/2004 | Singleton | |
| 8,052,185 B2 | 11/2011 | Madhani | |
| 8,245,594 B2 | 8/2012 | Rogers | |
| 8,276,958 B2 | 10/2012 | Ihrke et al. | |
| 8,412,376 B2 | 4/2013 | Abdallah et al. | |
| 8,467,903 B2 | 6/2013 | Ihrke et al. | |
| 8,516,918 B2 | 8/2013 | Jacobsen et al. | |
| 8,573,663 B1 | 11/2013 | Lin | |
| 8,660,695 B2 | 2/2014 | De La Rosa Tames et al. | |
| 8,833,826 B2 | 9/2014 | Garcia | |

(Continued)

FOREIGN PATENT DOCUMENTS

| | | | |
|---|---|---|---|
| CN | 203283310 U | 11/2013 | |
| WO | WO-2016194067 A1 * | 12/2016 | B25J 15/0233 |

*Primary Examiner* — Gabriela M Puig
(74) *Attorney, Agent, or Firm* — Timothy E. Siegel Patent Law, PLLC; Timothy E. Siegel

(57) ABSTRACT

A tendon and rigid element assembly that includes a tendon subassembly, including a tendon having a longitudinal end having a mating portion. Also, a rigid element has a mating portion. Further, a first one of the mating portions includes a set of projections and a second one of the mating portions defines a set of indentations that are sized and shaped to accept and retain the projections and wherein the set of projections are secured in the set of indentations, thereby securing the tendon to the rigid element.

11 Claims, 6 Drawing Sheets

(56) References Cited

U.S. PATENT DOCUMENTS

| | | |
|---|---|---|
| 9,844,886 B2 | 12/2017 | Beevers |
| 9,878,452 B2 * | 1/2018 | Davis ........................ B25J 9/104 |
| 10,029,375 B2 | 7/2018 | Beevers |
| 2005/0107667 A1 | 5/2005 | Danitz |
| 2010/0280662 A1 | 11/2010 | Abdallah et al. |
| 2011/0071664 A1 | 3/2011 | Linn |
| 2013/0226350 A1 * | 8/2013 | Bergelin ................ B25J 9/0006 700/275 |
| 2016/0361820 A1 * | 12/2016 | Davis ........................ B25J 9/104 |
| 2018/0098862 A1 * | 4/2018 | Kuiken ................... A61F 2/583 |

* cited by examiner

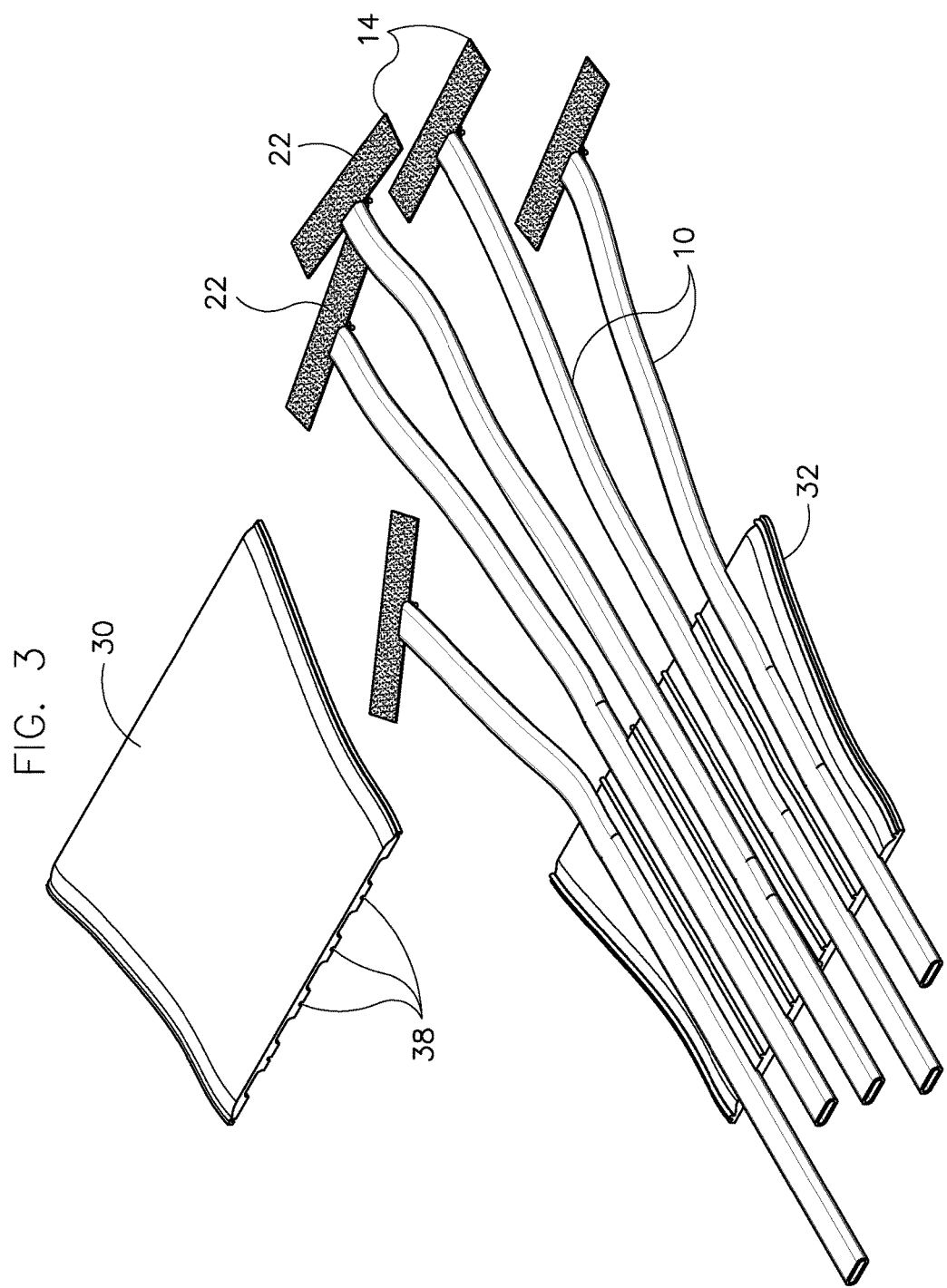

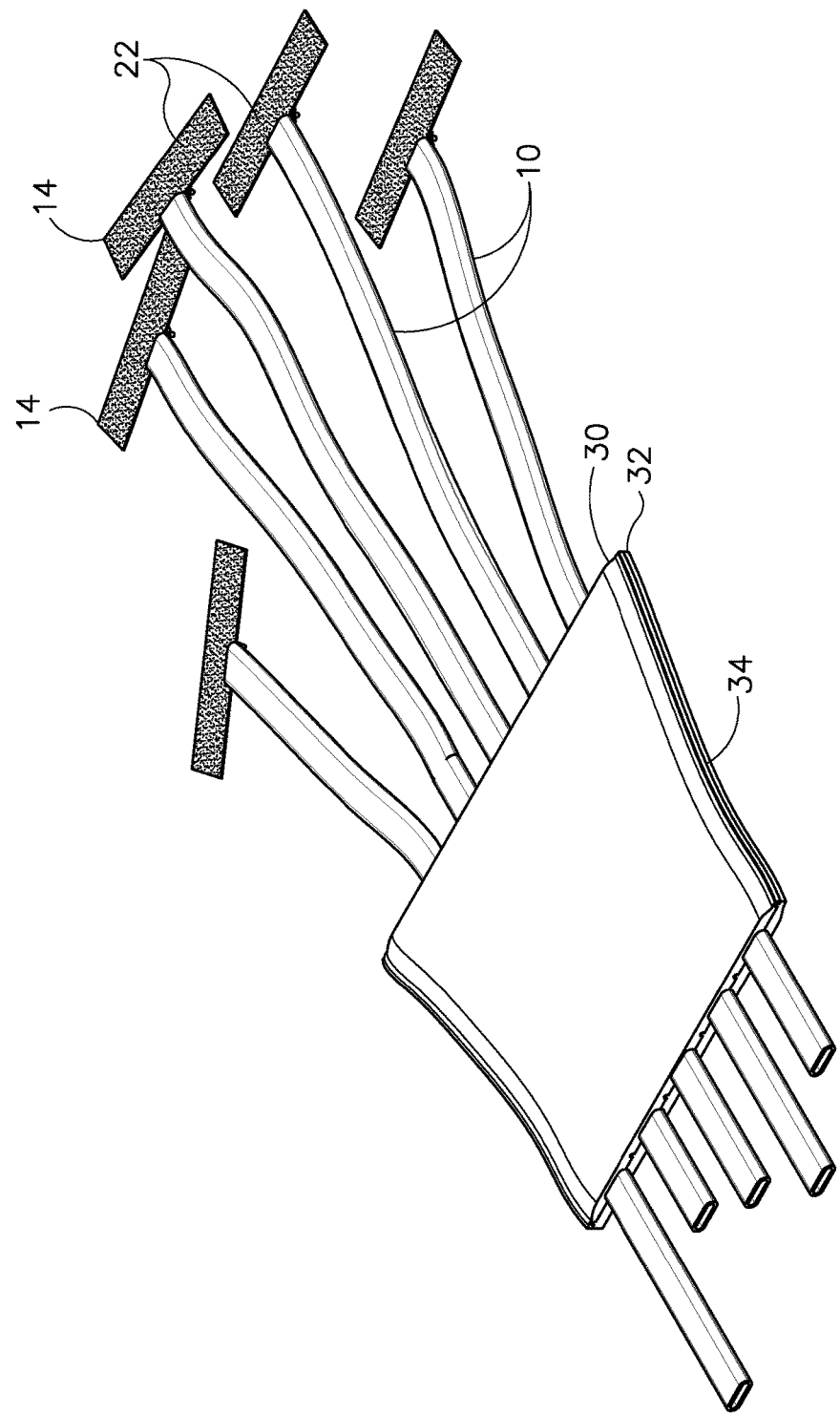

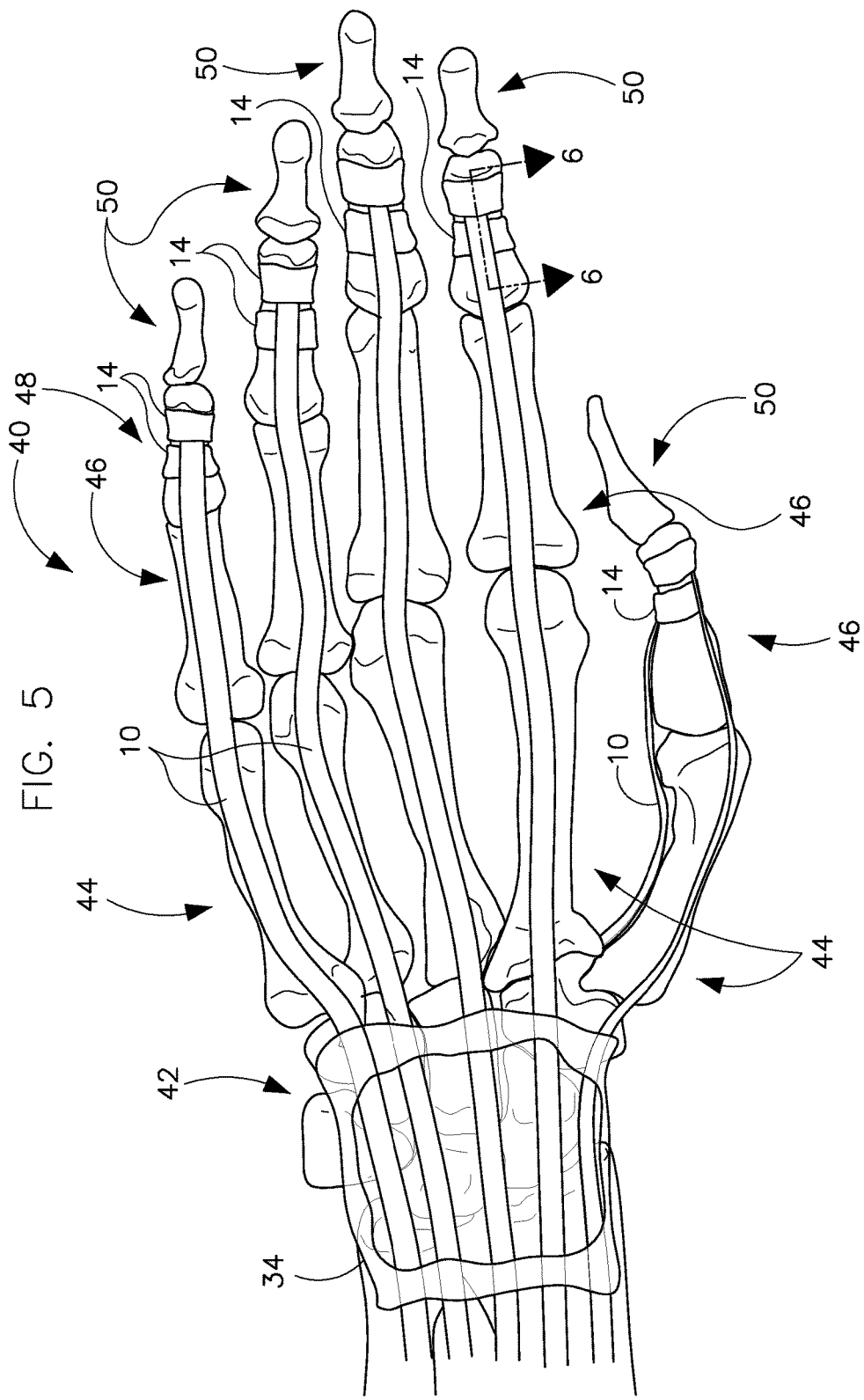

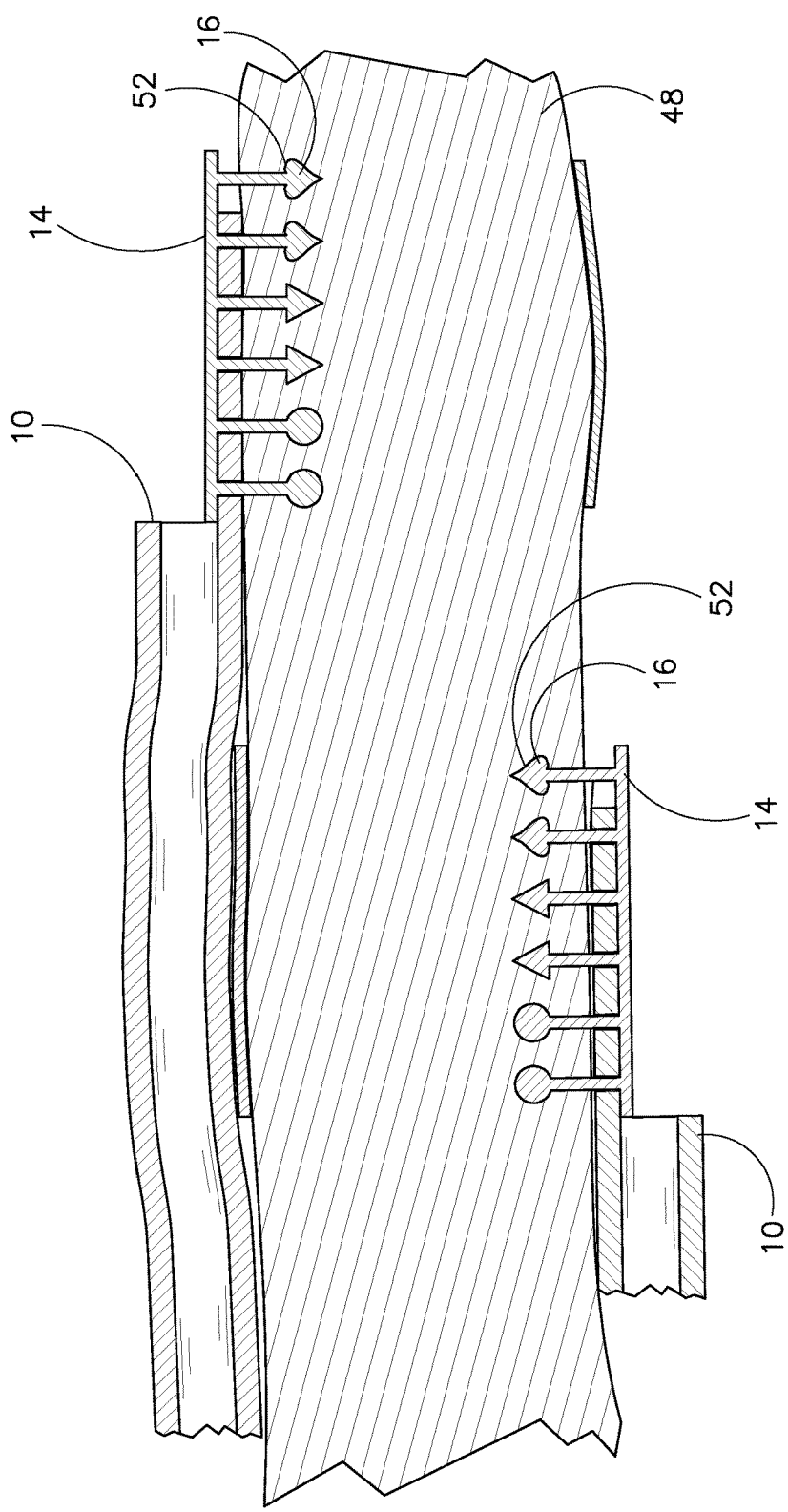

TENDON AND RIGID ELEMENT ASSEMBLY

RELATED APPLICATIONS

This application is a continuation of application U.S. Ser. No. 15/843,413, filed Dec. 15, 2017, which is itself a continuation of application U.S. Ser. No. 14/734,390, filed on Jun. 9, 2015, now U.S. Pat. No. 9,844,886 issued Dec. 19, 2017, which are incorporated by reference as if fully set forth herein.

BACKGROUND

Robotics is gradually shifting from the design of robots that move very quickly through a carefully defined set of motions to robots that have a higher intelligence and a greater range of operation. As robotics advances, various barriers to further progress may emerge. Among the problems encountered in robot design is the use of complex mechanisms to transfer force from a motor to an arm or finger that needs to be moved. These complex mechanisms may include discrete fasteners and multiple hinge components, that are challenging to align and secure. This adds to the expense and defect rate of the manufacturing process.

Also, the greater the mechanical complexity, the greater the tendency for a mechanism to break down and require repair. The task of repair is also made more difficult, as complexity is increased. A simpler system of interconnections for force transfer would ease the task of originating a robust robot design.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a tendon and rigid element assembly that includes a tendon subassembly, including a tendon having a longitudinal end having a mating portion. Also, a rigid element has a mating portion. Further, a first one of the mating portions includes a set of projections and a second one of the mating portions defines a set of indentations that are sized and shaped to accept and retain the projections and wherein the set of projections are secured in the set of indentations, thereby securing the tendon to the rigid element.

In a second separate aspect, the present invention may take the form of a tendon and rigid element assembly, comprising a tendon subassembly, including a tendon having a longitudinal end having a pair of wings, extending laterally from the longitudinal end of the tendon and a rigid element having a mating portion. The wings are secured about the rigid element to secure the tendon subassembly to the rigid element.

In addition to the exemplary aspects and embodiments described above, further aspects and embodiments will become apparent by reference to the drawings and by study of the following detailed descriptions.

BRIEF DESCRIPTION OF THE DRAWINGS

FIG. 3 is an isometric view of the set of robot tendon assemblies of FIG. 1, taken from the first side, and also showing two halves of a tendon sleeve, with the tendons being placed in a first half of the sleeve.

FIG. 4 is an isometric view of the tendon assemblies and sleeve halves of FIG. 3, with the sleeve halves being closed about the tendons, to form a complete sleeve.

FIG. 5 is a top view of a robot hand showing the tendon assemblies and sleeve of FIG. 4, placed into their environments, and with the tendon assemblies attached to the rigid elements of the hand.

FIG. 6 is an expanded detail section view, taken along lines 6-6 of FIG. 5.

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 1:
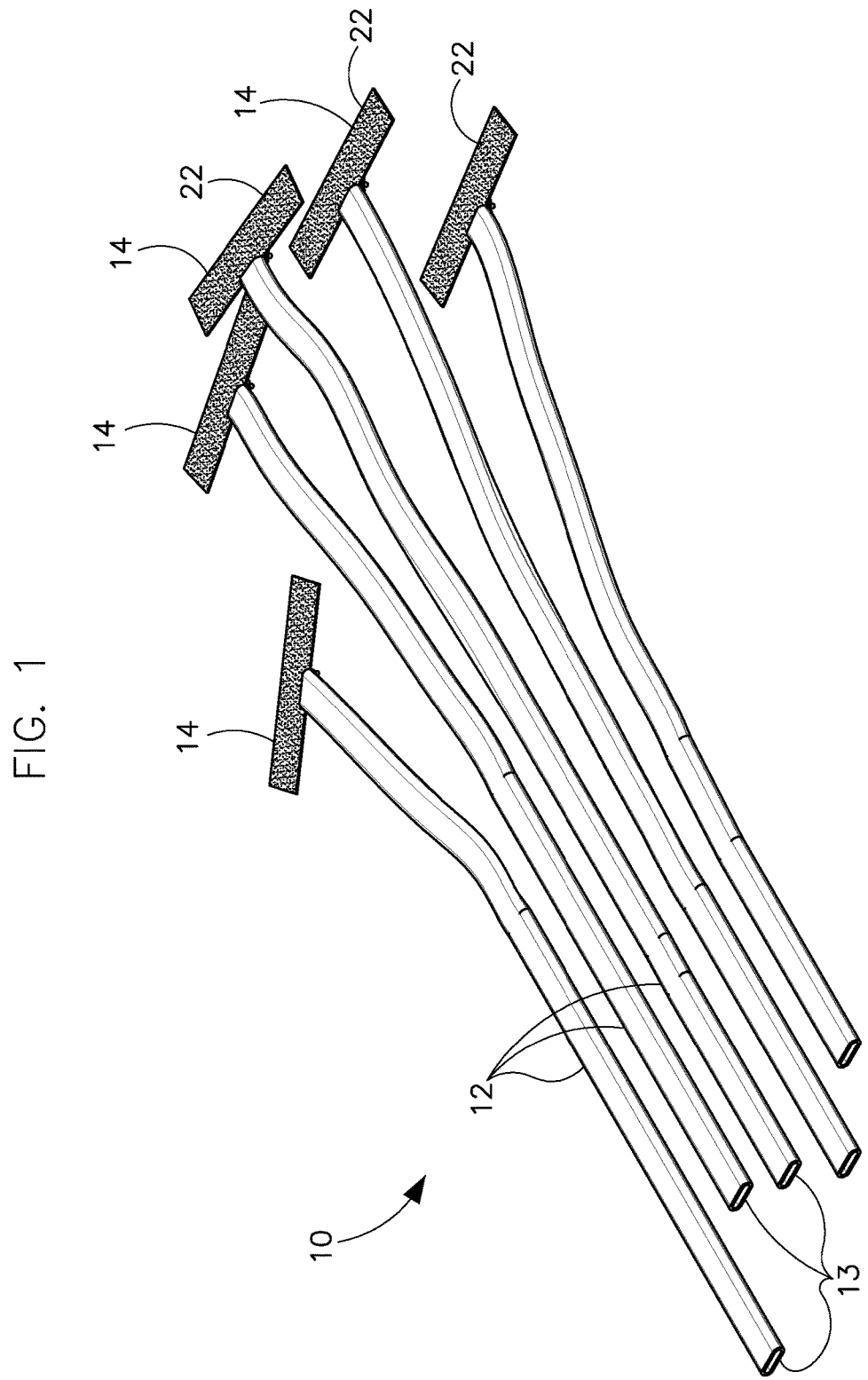
FIG. 1 is an isometric view of a first side of a set of robot tendon assemblies.
Figure 2:
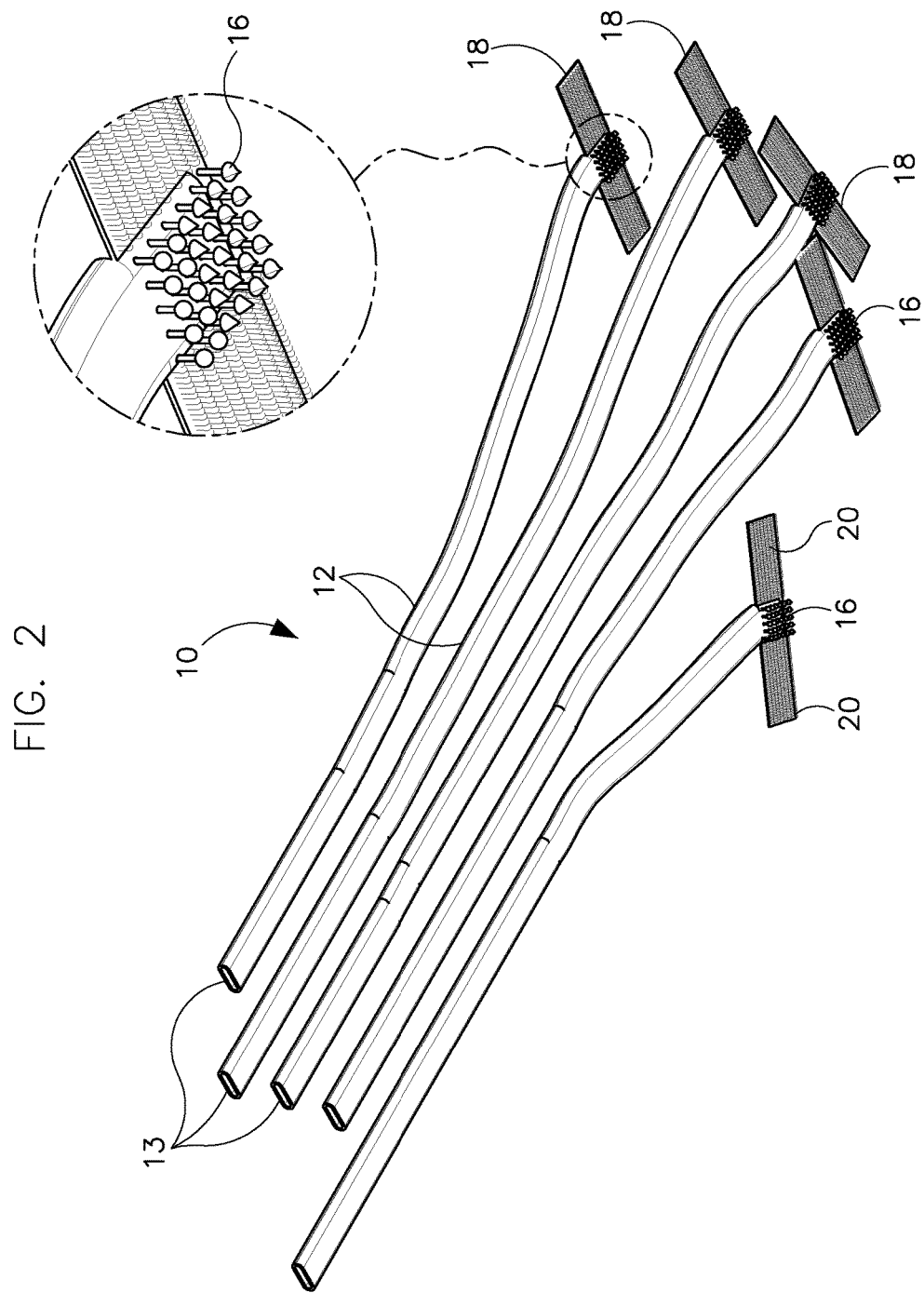
FIG. 2 is an isometric view of the set of robot tendon assemblies of FIG. 1, taken from a second side, that is opposed to the first side.

Referring to FIGS. 1 and 2, a set of tendons 10 are shown, in this case for manipulating the fingers of a robot hand. Each tendon 10 is made up of a tension transmitting portion 12, each defining a lumen 13, and an attachment portion 14. Referring to FIG. 2, each attachment portion 14 is, on a first major surface, made up of a central field of deformable projections 16 and a pair of wings 18, covered with loop material 20. On a second major surface, facing opposite from the first major surface, attachment portion 14 is covered with hook material 22. Accordingly, when an attachment portion 14 is wrapped about a post, hook material 22 mates with loop material 20. In an alternative preferred embodiment (not shown), wings that are generally similar in shape to wings 18 each have an adhesive surface for adhesively bonding said wings about a post.

Referring to FIGS. 3 and 4, an upper sleeve-half 30 and a lower sleeve-half 32 are joined together about tendons 10, to form a retaining sleeve 34 for tendons 10. The interior surfaces of sleeve 34 that contact tendons 10 are either made of a naturally lubricious material, such as poly tetrafluoroethylene or coated with a lubricant. Channels are formed by protruding linear elements 36 (not shown), which interlock with narrow channels 38.

Referring to FIG. 5, a robotic hand assembly 40 is shown, in form mimicking a human hand having carpals 42, metacarpals 44, proximal phalanges 46, intermediate phalanges 48 and distal phalanges 50. The thumb does not have an intermediate phalange 48. In the embodiment shown, a first tendon 10 is attached to the back or dorsal side of each intermediate phalange 48, in part by wings 18 (FIG. 2). In the case of the thumb, a tendon 10 is attached to the proximal phalange. In like manner, a second tendon 10 is attached to the front or palmar side of each intermediate phalange 48, and on the proximal phalange 46 of the thumb. In FIG. 5, only the attachment portion 14 is visible of the second tendons that attach to the intermediate phalanges.

In an alternative preferred embodiment, the tendons 10 are each attached to a distal phalange 50. In an alternative embodiment, there is a separate tendon 10 attached to each phalange, 46, 48 and 50, or a single tendon attached to each phalange, 46, 48 and 50 that form into a single finger. In one preferred embodiment tendons 10 are moved by a tension force applicator (not shown), to pull the intermediate phalanges 48 inwardly. In this embodiment, tendons 10 are slidingly engaged with bones 42, 44 and 46, with guide elements keeping them in place. In another embodiment, intermediate 48 or distal phalange 50 is pulled by means of a tendon (not shown) that is threaded through lumen 13 (FIGS. 1 and 2). In either one of these embodiments, lumens 13 may be used for conductive elements, carrying electrical signals.

Referring to FIG. 6, which is a detail view of an attachment between tendon 10 and intermediate phalange 48, projections 16 fit into matching receptacles 52, to collectively form a strong bond between tendon 10 and phalange 48. Although in the embodiment shown the bones 42 mimic the shape of human finger bones, in alternative preferred embodiments they are simply a set of shafts, moveably attached together. More broadly, phalanges 46, 48 and 50 may be considered rigid elements. The scope of this invention is not limited to robot assemblies that have a similar appearance to the bone structure of a human hand, but extends to all jointed assemblies.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A tendon and rigid element assembly, comprising:
   (a) a tendon subassembly, including a tendon having a longitudinal end having a mating portion;
   (b) a rigid element having a mating portions; and
   (c) wherein a first one of said mating portions includes a set of projections and a second one of said mating portions defines a set of indentations that are sized and shaped to accept and retain said projections and wherein said set of projections are secured in said set of indentations, thereby securing said tendon to said rigid element.

2. The assembly of claim 1, wherein said first one of said mating portions is part of said tendon subassembly and said second one of said mating portions is on said rigid element.

3. The assembly of claim 1, wherein said first one of said mating portions is on said rigid element and said second one of said mating portions is part of said tendon subassembly.

4. The assembly of claim 1, wherein said tendon subassembly also includes a pair of wings, extending laterally from said longitudinal end of said tendon, said wings wrapped about said rigid element, and joined together to further secure said tendon subassembly to said rigid element.

5. The assembly of claim 4, wherein each wing of said pair of wings includes a first major surface and a second major surface and wherein each first major surface is covered with hook material and each said second major surface is covered with loop material.

6. The assembly of claim 1, wherein said tendon subassembly defines an interior lumen.

7. The assembly of claim 1, further including a rigid support element and wherein said rigid element is moveably attached to said rigid support element.

8. The assembly of claim 7, further including an additional tendon having a longitudinal end having a second mating portion and wherein said mating portion of said rigid element is on a first surface of said rigid element and said rigid element has a second surface opposed to said first surface and said rigid element further includes a second mating portion on said second surface and wherein a first one of said second mating portions includes a set of projections and a second one of said mating portions includes a set of indentations sized and shaped to accept and retain said set of projections and wherein said set of second projections are secured in said set of second indentations, thereby securing said additional tendon to said rigid element.

9. A tendon and rigid element assembly, comprising:
   (a) a tendon subassembly, including a tendon having a longitudinal end having a pair of wings, extending laterally from said longitudinal end of said tendon;
   (b) a rigid element having a mating portion; and
   (c) and wherein said wings are secured about said rigid element to secure said tendon subassembly to said rigid element.

10. The assembly of claim 9, wherein each wing of said pair of wings includes a first major surface and a second major surface and wherein each first major surface is covered with hook material and each said second major surface is covered with loop material.

11. The assembly of claim 9, wherein each wing of said pair of wings includes an adhesive surface that adhesively binds said wings to said rigid element.

* * * * *